(12) United States Patent
Thomson (10) Patent No.: US 10,701,862 B2
(45) Date of Patent: Jul. 7, 2020

(54) AGRICULTURAL HEADER WITH FLOAT CONTROL

(71) Applicant: Macdon Industries Ltd., Winnipeg (CA)

(72) Inventor: Ryan Patterson Thomson, Winnipeg (CA)

(73) Assignee: MacDon Industries Ltd., Winnipeg, MB (CA)

(*) Notice: Subject to any disclaimer, the term of this patent is extended or adjusted under 35 U.S.C. 154(b) by 116 days.

(21) Appl. No.: 15/886,261

(22) Filed: Feb. 1, 2018

(65) Prior Publication Data

US 2019/0230857 A1    Aug. 1, 2019

(51) Int. Cl.
| | | |
|---|---|---|
| *A01D 41/14* | (2006.01) | |
| *A01D 34/00* | (2006.01) | |
| *A01D 34/04* | (2006.01) | |
| *A01D 61/00* | (2006.01) | |
| *A01D 57/12* | (2006.01) | |
| *A01D 34/14* | (2006.01) | |

(52) U.S. Cl.
CPC ......... *A01D 41/141* (2013.01); *A01D 34/006* (2013.01); *A01D 34/04* (2013.01); *A01D 41/145* (2013.01); *A01D 61/008* (2013.01); *A01D 34/14* (2013.01); *A01D 57/12* (2013.01)

(58) Field of Classification Search
CPC ....... A01B 61/046; A01B 63/00; A01B 63/10; A01B 63/111; A01D 41/141; A01D 41/145; A01D 41/14; A01D 75/287; A01D 34/008; A01D 41/06; A01D 41/144; A01D 61/008; A01D 34/04; A01D 34/006; A01D 34/14; A01D 57/12
See application file for complete search history.

(56) References Cited

U.S. PATENT DOCUMENTS

| | | | | |
|---|---|---|---|---|
| 3,731,470 A | * | 5/1973 | Cornish ............... | A01D 75/285 56/10.4 |
| 4,266,395 A | * | 5/1981 | Basham ............... | A01D 75/287 56/16.2 |
| 5,359,836 A | * | 11/1994 | Zeuner ................. | A01D 41/141 56/10.2 E |

(Continued)

FOREIGN PATENT DOCUMENTS

| | | | | |
|---|---|---|---|---|
| WO | WO-2013071442 A1 | * | 5/2013 | ............. A01D 67/00 |
| WO | WO-2013071443 A1 | * | 5/2013 | ........... A01D 34/008 |
| WO | WO-2013071445 A1 | * | 5/2013 | ........... A01D 34/008 |

*Primary Examiner* — Arpad Fabian-Kovacs
(74) *Attorney, Agent, or Firm* — Adrian D. Battison; Ade & Company Inc.; Ryan W. Dupuis (57) ABSTRACT

A harvesting header on a vehicle such as a combine harvester includes a mounting assembly comprising left and right float elements each for applying controlled left and right lift forces and arranged to allow upward floating of each end of the header in response to ground contact. Left and right sensors detect the angle of tilt of the header and a control system operates to reduce the left lift force when the left end is raised and to reduce the right lift force when the right end is raised. On a combine harvester this can be done by rotating the face plate of the feeder house in the required direction. In other systems the force generated by the left and right float elements can be directly modified. The changes to the lift force are applied only when the propulsion vehicle is tilted beyond a predetermined angle.

18 Claims, 6 Drawing Sheets

(56) References Cited

U.S. PATENT DOCUMENTS

| | | | | |
|---|---|---|---|---|
| 5,415,586 | A * | 5/1995 | Hanson | A01D 75/287 180/41 |
| 5,704,200 | A * | 1/1998 | Chmielewski, Jr. | A01D 41/141 56/10.2 E |
| 5,918,448 | A * | 7/1999 | Wheeler | A01D 75/287 56/10.2 E |
| 6,510,680 | B2 * | 1/2003 | Uhlending | A01D 75/287 56/10.2 E |
| 7,360,351 | B2 * | 4/2008 | Rickert | A01D 41/144 56/228 |
| 8,826,635 | B2 * | 9/2014 | Schraeder | A01D 41/145 56/10.2 E |
| 2007/0068129 | A1 * | 3/2007 | Strosser | A01D 41/141 56/10.2 E |
| 2008/0072560 | A1 * | 3/2008 | Talbot | A01D 41/14 56/208 |
| 2010/0281837 | A1 * | 11/2010 | Talbot | A01D 41/141 56/10.2 E |
| 2013/0125521 | A1 * | 5/2013 | Patterson | A01D 43/04 56/14.5 |
| 2013/0192187 | A1 * | 8/2013 | Boyd, III | A01D 41/16 56/12.7 |
| 2015/0033692 | A1 * | 2/2015 | Schroeder | A01D 34/008 56/10.2 E |
| 2015/0271999 | A1 * | 10/2015 | Enns | G05B 15/02 700/275 |
| 2016/0106021 | A1 * | 4/2016 | Lohrentz | A01B 63/10 56/11.9 |
| 2018/0255706 | A1 * | 9/2018 | Smith | A01D 41/12 |
| 2019/0082598 | A1 * | 3/2019 | Seiders, Jr. | A01D 41/141 |

* cited by examiner

AGRICULTURAL HEADER WITH FLOAT CONTROL

FIELD OF THE INVENTION

The present invention relates to an agricultural header for mounting on a support vehicle for cutting a standing crop where the header includes a float suspension system for supporting the header on the vehicle.

BACKGROUND OF THE INVENTION

The present invention can be used in many different engaging systems such as hay tools, rakes, pickups, etc but is particularly applicable both for swathers or windrowers where the header is carried on a swather tractor and for combine harvesters where the header is carried by a combine adapter connected to the feeder house. If used for cutting crop for harvesting, the header can use different cutting systems including sickle bars and rotary mowers or like cutting arrangements.

Most windrowers on the market all have some type of hydraulic header flotation. These types of flotation systems suspend the header from the windrower so that there remains a small percentage of the header mass supported by the ground. The advantages to these types of hydraulic float systems include the ability to easily adjust to a wide range of header weights/types, full adjustability of flotation system from the cab, few moving parts, compact, has built in dampening effects and is well received in the market.

In the traditional hydraulic float systems, the header float cylinders are connected to a respective accumulator, pressure sensor and pressure control valve. The pressure control valves are in turn connected to a hydraulic pressure source such as a load sense pump. The controller receives input signals from the pressure sensors and makes adjustments to the pressure control valves to maintain a known pressure in the accumulator/cylinder circuit. The accumulator/cylinder system acts much like a spring so that when the header hits an obstacle and needs to go over the obstacle, the accumulator supplies pressure and flow to the cylinder to aid the movement of the header. When the header needs to go down into a ditch or low spot, the float cylinder drives oil back into the accumulator.

The assignees of the present application, MacDon, has traditionally maintained a coil spring flotation system that typically has better ground following capabilities. A typical MacDon spring flotation system can achieve ground pressure in the order of 10% of the header mass while still having acceptable ground following capabilities. The spring flotation systems are currently used on MacDon windrowers and combine adapters.

Typical combine harvesters have an arrangement in which the header is fixedly mounted to the feeder house and hence cannot float on the ground but instead is controlled in position by movement of the feeder house. This includes up and down movement of the height of the header and also twisting movement about a generally forwardly extending axis obtained by twisting a front face plate of the feeder house to which the header is mounted, about the axis longitudinal of the feeder house.

SUMMARY OF THE INVENTION

According to one aspect of the invention there is provided a crop harvesting header comprising:

a main frame structure extending across a width of the header for movement in a forward direction generally at right angles to the width across ground including a crop to be harvested;

a mounting assembly for carrying the main frame structure on a propulsion vehicle;

a cutter bar across a front of the table arranged to move through the crop in a cutting action for cutting the crop as the header is moved forwardly;

a ground engaging element arranged so that the cutter bar is supported adjacent the ground for cutting crop close to the ground as the ground engaging element moves over the ground;

the mounting assembly comprising left and right float elements each for applying controlled left and right lift forces to the header;

the float elements being arranged to allow lifting of each end of the header relative to an opposed end so as to change an angle of tilt of the header relative to the propulsion vehicle;

at least one sensor for detecting the angle of tilt of the header so as to detect when the left end is raised relative to the right end and when the right end is raised relative to the left end;

and a control system for decreasing the left lift force when said at least one sensor indicates that the left end is raised relative to the right end and for decreasing the right lift force when said at least one sensor indicates that the right end is raised relative to the left end.

In some embodiments each float element can comprise a cylinder where a lift force of the cylinder is controlled by changing a hydraulic pressure to a chamber of the cylinder using a pressure control system response to the electronic control.

In other embodiments each float element can comprise a spring, which can be formed by a plurality of springs, where a lift force of the spring is controlled by changing an effective length of the spring. That is typically an upper end of the spring connected to the vehicle is raised and lowered by a control system to extend and release the spring to change the lift force.

In some cases the left and right tilt of the header relative to the vehicle can be detected by a dedicated tilt sensor. However in most cases a tilt sensing system is provided by separate left and right sensors providing a differential signal and also providing an averaged signal to a height control system for raising and lowering a support element of the propulsion vehicle.

Preferably there is provided a sensor responsive to tilt of the propulsion vehicle relative to a longitudinal axis of the vehicle and the control system acts for decreasing the left lift force when said at least one sensor indicates that the left end is raised relative to the right end and for decreasing the right lift force when said at least one sensor indicates that the right end is raised relative to the left end only when the tilt of the propulsion vehicle is greater than a predetermined angle of tilt.

In one particular embodiment, the propulsion vehicle is a combine harvester having a feeder house and a face plate thereon rotatable about a longitudinal axis. In this embodiment the control system can act to rotate the face plate to change the left and right lift forces. In this arrangement the face plate is typically rotated under control of a combine electronics system in response to signals from the sensors. It is necessary therefore in this construction to manage this system by the control system operating to provide calculated pseudo sensor values to the combine electronics system in replacement for actual sensor values to change said left and right lift forces.

In other arrangements where there is no rotatable face plate, the left and right float elements are each connected between a location connected to the propulsion vehicle and the header and the control system operates to change the actual lift force provided by each of the left and right float elements.

While the present arrangement has advantage in respect of a conventional header having a rigid frame or where the frame is fixed so as to be rigid when used in a particular mode, the arrangement is particularly advantageous where the main frame structure includes a center frame portion, a first wing frame portion and a second wing frame portion.

In such constructions, generally the first wing frame portion is connected to the center frame portion by a first pivot coupling which provides pivotal movement of the first wing frame portion relative to the center frame portion about a first pivot axis extending in a plane parallel to the forward direction; the first pivot coupling acts to support weight from the first wing frame portion while outboard weight from the first wing frame portion outboard of the first pivot coupling rotates the first wing frame portion about the first pivot coupling in a downward direction; the second wing frame portion is connected to the center frame portion by a second pivot coupling which provides pivotal movement of the second wing frame portion relative to the center frame portion about a second pivot axis extending in a plane parallel to the forward direction; the second pivot coupling acts to support weight from the second wing frame portion while outboard weight from the second wing frame portion outboard of the second pivot coupling rotates the second wing frame portion about the second pivot coupling in a downward direction; a first interconnecting float linkage is connected between the center frame portion and the first wing frame portion which communicates a first variable lifting force from the center frame portion to the first wing frame portion against the outboard weight of the first wing frame portion; and a second interconnecting linkage is connected between the center frame portion and the second wing frame portion which communicates a second variable lifting force from the center frame portion to the second wing frame portion against the outboard weight of the second wing frame portion.

The wing flex system is balanced by the header weight. Because of the vertical height of the center of gravity, lateral tilt causes the vector of the CoG change where it pierces the plane between the header lift legs. This causes a force imbalance between the left and right lift legs, which causes a force imbalance in the flex from left to right. This can have several side effects, one of which is that the wings stop following the ground as they should.

The concept behind the present arrangement as described herein is to use the measured difference in position of the left and right adaptor lift legs defining the left and right float elements in order to try and correct this imbalance. Due to the complex nature of the flex, the system needs to empirically determine the relationship between the right and left lift leg that balances the flex on a given side hill. This will manifest as the combine faceplate tilting in the counter or 'uphill' direction by a calculated amount.

The lateral tilt can also be used to extend the flex range by tilting the combine faceplate in the 'downhill' direction when the float system is approaching the end of its range.

Thus the system has two different behaviors for these two scenarios: one that tilts the faceplate 'uphill' if the side hill is greater than some threshold, and another behavior that follows the adaptor center section by rotating in the conventional downhill direction in order to extend the flex range.

The combine lateral tilt function generally aims to maintain a specific difference between the left and right sensors. This difference target is gathered during a calibration process. Thus in the present arrangement the system act to offset the left and right signals in equal magnitude but opposite directions which acts to "trick" the combine control system into targeting a different 'difference' without affecting the 'average' used by the combine control system to maintain the required float height.

Depending on combine make/model, various settings and sensitivities can be set through the operator station, including raise and lower rates, combine control loop sensitivity and lateral tilt sensitivity.

According to a second aspect of the invention there is provided a combine harvester comprising:

a harvester body on ground wheels for moving across ground to be harvested;

a feeder house for feeding crop into the harvester body;

a face plate at a front of the feeder house rotatable about a longitudinal axis;

a header mounted on the face plate having a main frame structure extending across a width of the header for movement in a forward direction generally at right angles to the width across the ground;

a mounting assembly for carrying the main frame structure on the face plate;

a cutter bar across a front of the table arranged to move through the crop in a cutting action for cutting the crop as the header is moved forwardly;

a ground engaging element arranged so that the cutter bar is supported adjacent the ground for cutting crop close to the ground as the ground engaging element moves over the ground;

the mounting assembly comprising left and right float elements each for applying left and right lift forces to the header, the float elements being arranged to allow lifting of each end of the header relative to an opposed end so as to change an angle of tilt of the header relative to the combine body;

at least one sensor for detecting the angle of tilt of the header so as to detect when the left end is raised relative to the right end and when the right end is raised relative to the left end;

wherein the face plate is rotated under control of a combine electronics system in response to signals from the sensors so as to modify the lift forces applied by the left and right float elements;

and wherein the header includes a control system which operates to provide calculated pseudo sensor values to the combine electronics system in replacement for actual sensor values to change said left and right lift forces.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
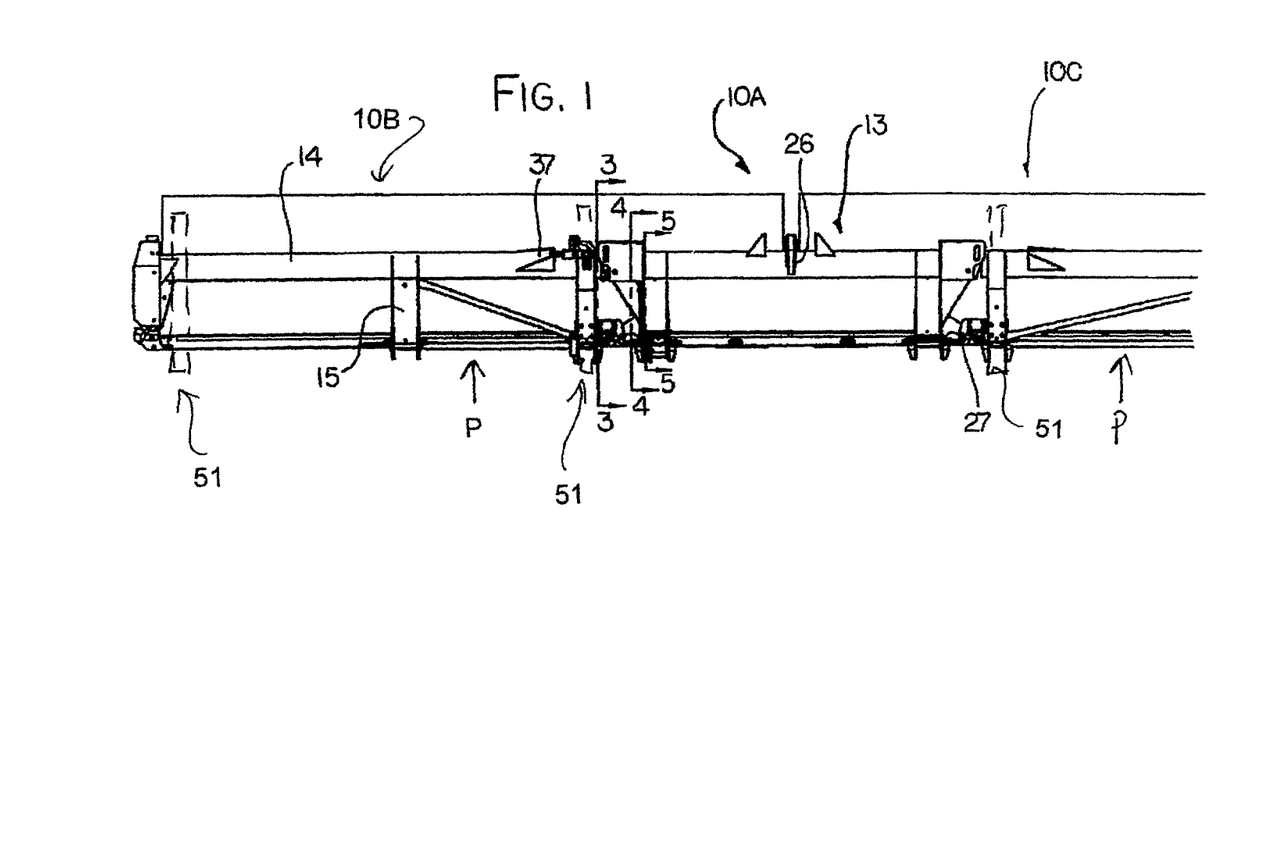
FIG. 1 is a rear elevational view of a multi-section header of the type with which the present invention is concerned.
Figure 2:
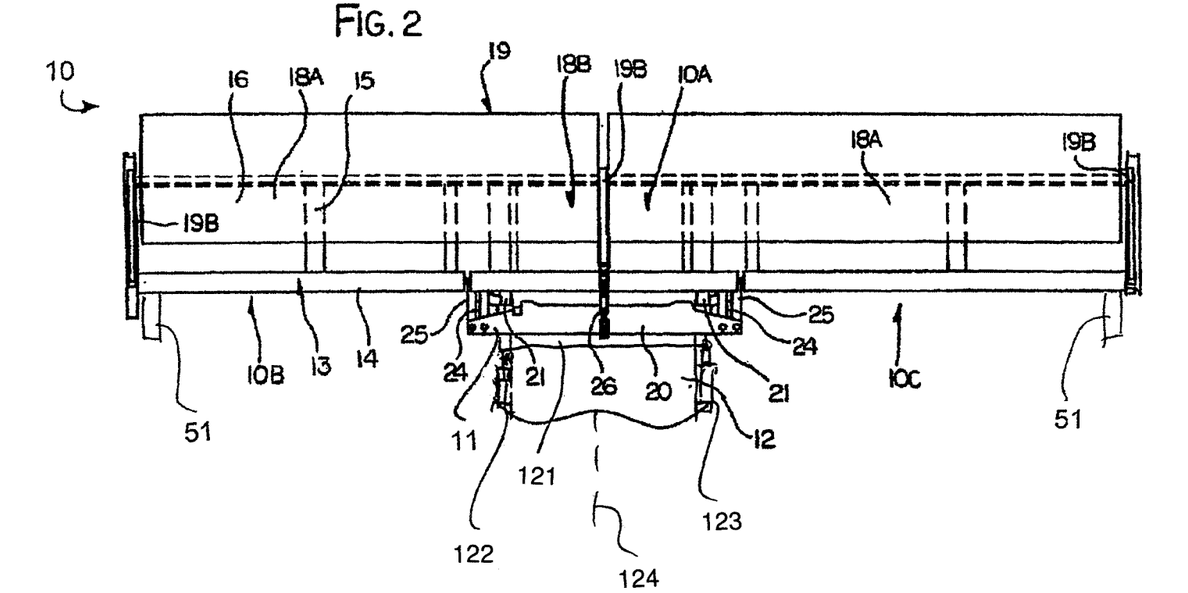
FIG. 2 is a top plan view of the multi-section header according to FIG. 1.

FIGS. 1 and 2 show in rear elevational view and in plan view respectively the header 10 carried on an adapter 11 attached to the feeder house 12 of a combine harvester. In FIG. 1 the adapter is omitted for convenience of illustration.

The header 10 includes a frame 13 defined by a main rear beam 14 and a plurality of forwardly extending arms 15 which extend downwardly from the beam 14 and then forwardly underneath a table 16 which extends across the header. At the forward end of the table 16 is provided a cutter bar 17. On top of the table 16 is provided a draper transport system 18 which carries the crop from the cutter bar across the header to a discharge location at the feeder house 12. The draper thus include two side drapers extending from respective ends of the header inwardly toward the feeder house and a center adapter section 18B which acts to feed the crop from the side drapers 18A rearwardly to the feeder housing.

Reference is made to prior application 2002/0129591 which discloses details of the adapter and its inter relation to the side drapers 18A, the disclosure of which is incorporated herein by reference.

The header further includes a reel 19 including a beam 19A on which is mounted a plurality of reel bats (not shown) which are carried on the beam 19A for rotation with the beam around the axis of the beam. The beam is carried on reel support arms 19B which extend from the beam rearwardly and upwardly to a support bracket attached to the transverse main beam 14. The reel arms can be raised and lowered by hydraulic cylinders 19D connected between the respective arm and the beam 14.

In the embodiment shown the reel is mounted on three arms 19B including two arms at the ends of the header and a single center arm. However additional arms may be provided so that there are four such arms with two center arms being spaced apart either side of the adapter 11. It is well known to provide an arrangement of the beam 19A and the bats which accommodate flexing movement of the reel so that one end can be higher than the other end without damaging the bats or the reel structure. Various different arrangements for accommodating such flexing movement are known and can be incorporated into the arrangement described herein, as is well known to one skilled in the art.

The adapter 11 provides a center support for the header at a center frame portion 10A and comprises a frame 20 which attaches to the feeder house 12 and carries at its lower end a pair of forwardly extending pivotal arms 21 which extend forwardly underneath respective ones of the frame members 15 of the header. The pivotal arms 21 can pivot upwardly and downwardly about a respective pivot pins 23 each independently of the other arm. Each arm is supported by a respective spring 24 carried on a respective stub arm 25 attached to the respective arm 21. Thus the spring 24 provides tension on the stub arm 25 pulling it upwardly around the pin 23 which acts to pull up the respective arm 21 and provide a lifting force underneath the header at a lifting point partway along the respective frame member 15 and underneath the draper 18 and the table 16. The springs can be replaced by pressure controlled float cylinders which can provide a required float force by changing the pressure as required n the cylinder to generate a required float force.

At the center of the adapter is provided a link 26 which extends from the frame 20 forwardly to the central bracket 19C of the beam arm support brackets. The link 26 is provided in the form of a hydraulic tilt cylinder which allows adjustment of the length of the cylinder thus pivoting the header forwardly and rearwardly about the support point of the arms 21 on the underside of the header. Thus the attitude of the header, that is the angle of the table 16 to the horizontal can be tilted by operation of the cylinder forming the link 26.

In addition the attitude of the header about an axis extending forwardly of the direction of movement that is at right angles to the transverse beam 14 is effected by the independent pivotal movement of the arms 21 provided by the springs 24 which act as a floatation system. In addition the whole header can float upwardly and downwardly on the springs 24 with the link 26 pivoting to accommodate the upward and downward movement and the arms 21 pivoting about the respective pin 23.

The table 16 provides behind the cutter bar 17 a skid plate 16A typically including a polymeric wear shield which is arranged to engage the ground. Thus upward force is provided from the ground which tends to lift the header taking weight off the support springs 24. In practice the springs are adjusted so that the springs act to support the majority of the weight of the header leaving a relatively small proportion of the weight to rest on the ground. Thus the header can float upwardly and downwardly as the ground provides areas of different height with one end of the header being movable upwardly independently of the other end by independent flexing of the springs 24. Thus the header tends to follow the ground level.

In some cases the header is rigid on that there is provided a common rigid frame across the full width. However more preferably the header is formed in a number of sections which are independently pivotal each relative to the next and in which adjustment of the lifting force provided by the springs 24 is transferred to each of the sections proportionally so that each section can float upwardly and downwardly and each section applies a force to the ground which is proportional to the total force of the whole header.

Thus in this embodiment the beam 14 is divided into a number of separate pieces depending upon the number of sections of the header. In the embodiment shown there are three sections including a center frame portion or section 10A carried on the propulsion vehicle by the adapter or center support 11, a first wing frame portion or section 10B and a second wing frame portion or section 10C. The center section 10A is mounted at the adapter so that the arms 21 extend into engagement with the center section. The wing sections are pivotally connected to the center section such that each can pivot upwardly and downwardly about a respective pivot axis generally parallel to the direction of movement.

Thus the beam 14 is split into three portions each co-operating with a respective one of the sections 10A, 10B and 10C and defining a main beam therefor. Each section of the beam 14 includes respective ones of the frame members 15 which support the respective portion of the table. Thus as best shown in FIG. 1, there is a break between the beam sections 14 of the center section 10A and one wing section 10B. The end most frame member 15A of the wing section 10B is arranged at the break. The end frame member 15B of the center section 10A is spaced inwardly from the break leaving space for a pivot coupling 27 extending from the frame member 15A to the frame member 15B and defining a pivot pin 27A lying on the pivot axis between the wing section 10B and the center section 10A. In a rear elevational view, the cutter bar 17 is also visible underneath the header at the forward end of the frame members 15 and at the front of the table 16.

In the embodiment shown the cutter bar 17 is split at a junction lying along the axis of a hinge pin so as to provide a pivot within the cutter bar allowing the cutter bar to bend at the junction.

In an alternative arrangement (not shown) the cutter bar can be formed in a manner which allows it to flex on the axis of the pin thus avoiding the necessity for a break in the cutter bar.

The cutter bar is of conventional shape including a U shaped member with generally horizontal legs and a front curved nose to which is attached the knife support flange of a conventional nature. The knife support flange includes a plurality of holes for mounting conventional knife guards.

A bridging link is connected across the break so as to hold the sections of the cutter bar 17 aligned while the pivotal movement occurs. The link comprises a plate welded to one part of the cutter bar with the link or plates spanning the break and extending to a pin which is welded to the other part of the cutter bar with the link being held in place by a nut.

Thus the two sections 10A and 10B are supported each relative to the other for pivotal movement of the wing section 10B about an axis extending through the hinge pin and through the break in the cutter bar 17 so that the wing section is supported at its inner end on the center section but can pivot downwardly at its outer end so that the weight at the outboard end is unsupported by the center section and causes downward or counter clockwise pivotal movement of the wing section 10B.

The wing section 10C is mounted in an identical or symmetrical manner for pivotal movement about the other end of the center section 10A. The amount of pivotal movement allowed of the wing section relative to the center section about the axis of the pivot pin is maintained at a small angle generally less than 6° and preferably less than 4° as controlled by suitable mechanical stop members which are provided at a suitable location with the required mechanical strength to support the wing frame section against upward or downward movement beyond the stop members. Suitable stop members can be designed by a person skilled in the art and the details of the stop members are not described herein.

The outboard weight of the wing section 10B is supported on an interconnecting linkage 30 which communicates that weight from the inner end of the beam 14 of the section 10B through to the support for the center section 10A at the springs 24. The linkage is shown particularly in FIGS. 4 and 5 as described in further detail below.

In general the linkage operates to transfer the outboard weight of the wing section inwardly to the center section and at the same time to balance the lifting force provided by the springs 24 so that it is proportionally applied to the center section and to the wing section.

Thus in general the header is attached to the combine feeder house using the float system described previously that supports the header so that it can be moved up when a vertical force about 1% to 15% of its weight is applied to the cutter bar from the ground. The reaction of the float linkage that typically supports 85% to 99% of the header weight on the header is used to balance the weight of the wings.

The system is designed so that if the operator sets the float so that the float system supports 99% of the header weight then the remaining 1% will be evenly distributed across the cutter bar. If the operator changes the float so that 85% is supported by the combine harvester then the remaining 15% would also be evenly distributed across the cutter bar without the operator making adjustments. Thus, not only is the total lifting force to each sections varied in proportion to the total lifting force but also that lifting force on each section is balanced across the width of section. As the sections are rigid between the ends, this requires that the lifting forces be balance between the ends to ensure the even distribution across the cutter bar of each section and thus of all the sections. This provides an arrangement in which the force required to lift the header is the same force at any location along the length of the cutter bar, whether that location is at the center section, at a junction between the center section and the wing section or at the wing section. This is achieved in this embodiment by the balancing system which transfers lifting force between the sections with the forces being balanced by a balance beam of the linkages 30.

The header frame sections and the reel sections are hinged and supported so that the reel will stay in approximately the same position relative to the cutter bar. Thus the balance beam as described in more detail hereinafter balances the lifting force applied to the ends of the center section relative to the lifting force which is applied to the outboard weight of the wing section so that the lifting force is even across the width of the header. Thus if a lifting force is applied by the ground or any other lifting mechanism for example merely manually lifting the header at a particular location across its width, that would cause the header to rise at that point and to fall at other points. The amount of force necessary to lift the header at that point will be the same as it is at other points and this lifting force can be varied for the total header and proportioned across the width of the header automatically by the balance beams as described hereinafter.

It will be appreciated that the inboard weight of the wing section is transferred through the pivot 27 to the outboard end of the center section and that weight is transferred directly to the balance beam. Also the outboard weight of the wing section is transferred through the linkages 30. Yet further a lifting force from the arm 21 is applied to the balance beam.

The whole support assembly including the linkages 30, the lift arm 21 and the springs 24 are arranged to provide a floating movement for each of the first and second frame portions that is the center and wing frame portions relative to each other and relative to the propulsion vehicle such that upward pressure from the ground on the skid element 16A which is greater in a downward force for a part of the weight of the header and supported by the lifting force tends to lift each of the center and wing frame portions relative to the propulsion vehicle.

The balance beam arrangement is arranged such that the first and second lifting forces are varied proportionally as the total lifting force $F_T$ is varied.

The height of the header is primarily controlled by controlling the height of the feeder house 20 of the combine harvester relative to the ground using a height control cylinder 100. Typically the feeder house is pivotally supported on a main frame of the combine harvester and an actuator member is mounted between the feeder house and the main frame to raise and lower the feeder house.

The height of the main structure of the header is in turn supported for up and down movement relative to the adapter 11 by supporting the main frame structure on the pivot arms 21 which are supported for floating movement by the float elements 24 by providing a total spring lifting force to the header. The linkages 30 in turn distribute this total spring force into a center lifting force which provides lift to the center frame section and the inboard ends of the wing frame sections pivotally coupled thereto as well as a first lifting force and a second lifting force acting upon the first and second wing frame sections respectively in a direction intending to cause the outboard ends of the wing frames to be raised upwardly.

The linkages 30 supporting the main frame structure on the pivot arms 21 comprises two balance linkages associated with the two pivot arms respectively. Each balance linkage includes a balance beam 102 pivotally supported at an intermediate location between front and rear ends on the forward ends of the pivot arms 21. The forward ends of the two balance beams 102 are pivotally connected to respective locations on the center section of the main frame structure at transversely spaced apart locations. The forward ends of the balance beams 102 serve to provide the center lifting force to the main frame structure. The opposing rear ends of the two balance beams 102 provide the first and second lifting forces to the first and second wing frame sections.

More particularly, the rear end of each balance beam 102 is pivotally connected to an upright compression link 104 which extends upwardly from the balance beam 102 below the main frame structure to a top end in proximity to a top end of the main frame structure. Each balance linkage further includes a bell crank 106 pivotally supported on the main frame structure adjacent the top end in which the bell crank includes a first lever 108 pivotally coupled to the top end of the respective compression link 104 and a second lever portion 110 extending upward to a pivot connection with a respective tension link 112.

Pivotal connection of the second lever 110 with the respective tension link 112 is located substantially directly above the pivotal connection of the bell crank to the main frame structure such that an upward force acting on the compression link 104 tends to rotate the bell crank in a direction corresponding to a laterally inward tension on the tension link 112 which is pivotally coupled at its outer end to a respective one of the wing frame sections which tends to pivot the wing frame section in a direction about its pivotal coupling to the center frame section in a direction corresponding to the outboard and of the wing frame section being raised upwardly.

The balance linkages 30 serve to balance the total lifting force provided by the combine harvester through the pivot arms 21 to the center lifting force at the forward ends of the balance beams 102 and the first and second lifting forces at the rear ends of the balance beams so as to vary the lifting forces as the total lifting force varies and so as to balance the lifting forces from the ground applied along the length of the skid element.

Figure 6:
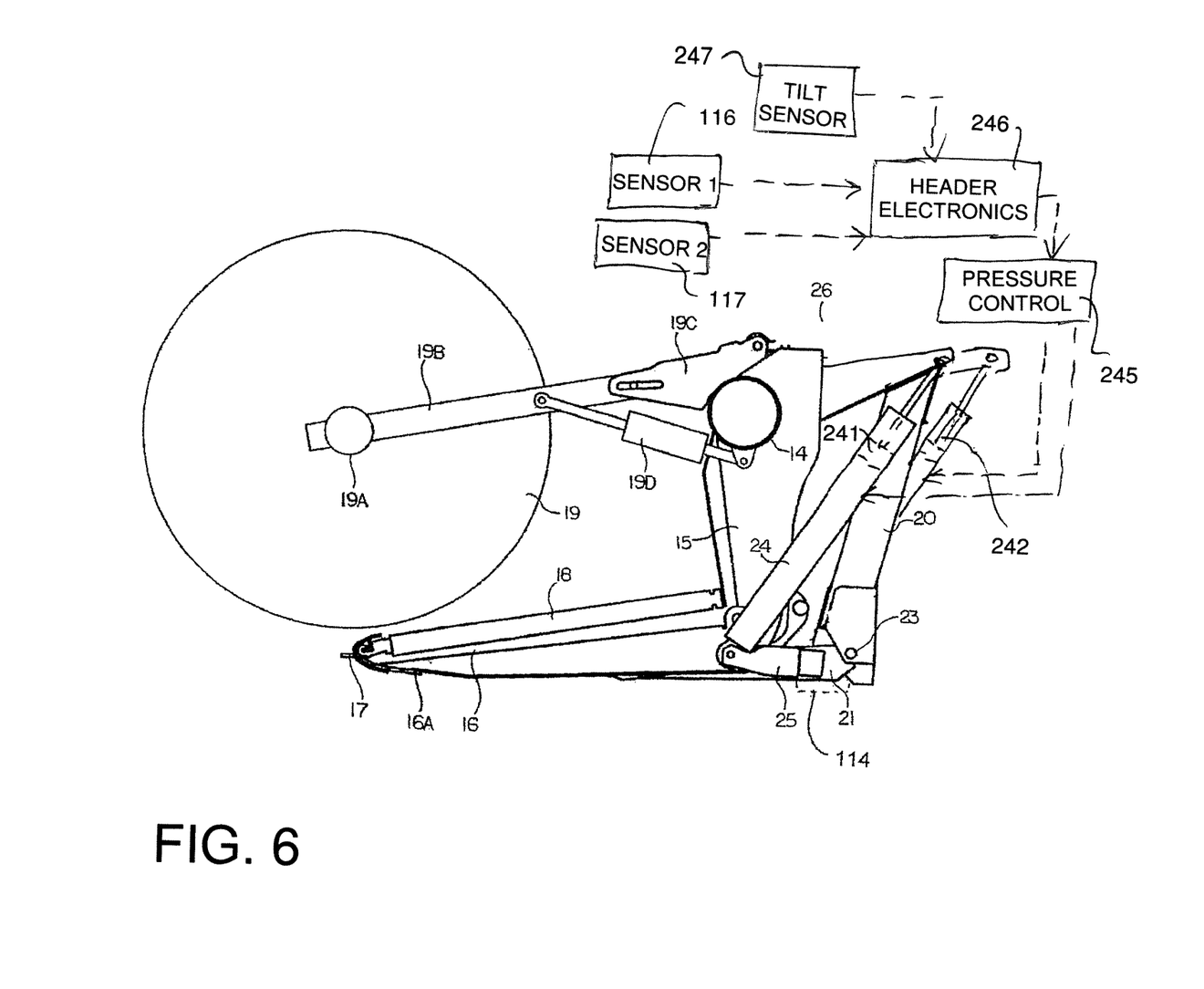
FIG. 6 is a view similar to that of FIG. 3 showing an alternative arrangement in which the header float control system operates directly on the float elements supporting the header.

The arrangement of the present invention relates particularly to the float control system which supports the header and controls the height of the header and the side to side tilt of the header. The system thus provides control of the lift force applied by the two separate support elements 24 which includes elements 241 and 242 as shown in FIG. 6.

Figure 4:
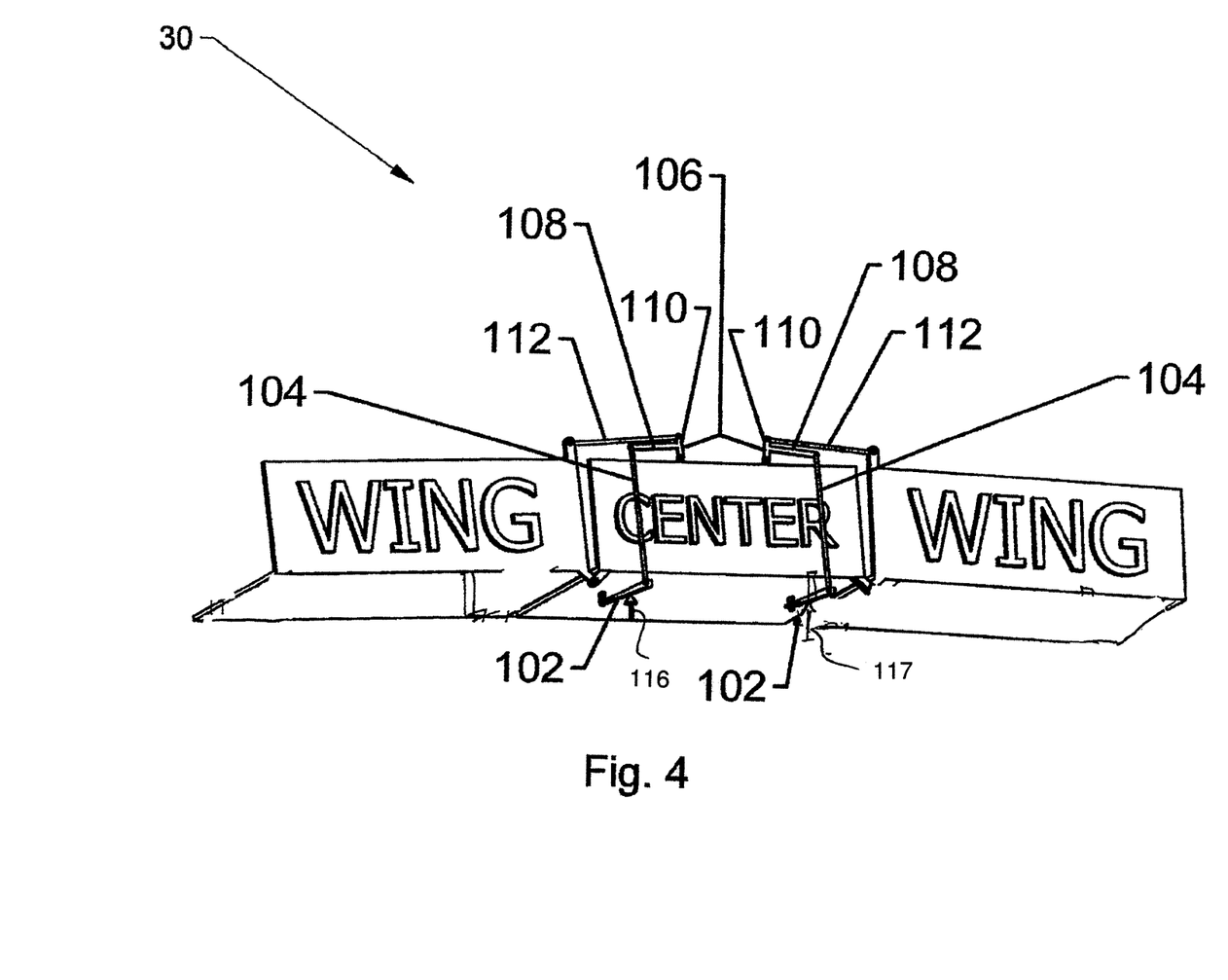
FIG. 4 is a schematic representation of the balancing linkage of the multi-section header according to FIG. 1.

Each float element 241, 242 is associated with a respective one of two separate distance sensors 116 and 117 which are provided each for sensing a distance of movement of the respective float element 241, 242. The distance sensors 116 and 117 therefore each generate and independent signal indicative of the sensed changes in the measured distance of the respective float element 24. As shown in FIG. 4, the sensor 116 is on the left of the header as shown to sense movements of the left end of the header and the sensor 117 is on the right to sense up and down movements of the right end.

The header further includes a stop member 114 which is arranged to limit downward movement of the main frame structure of the header relative to the adapter.

Figure 5:
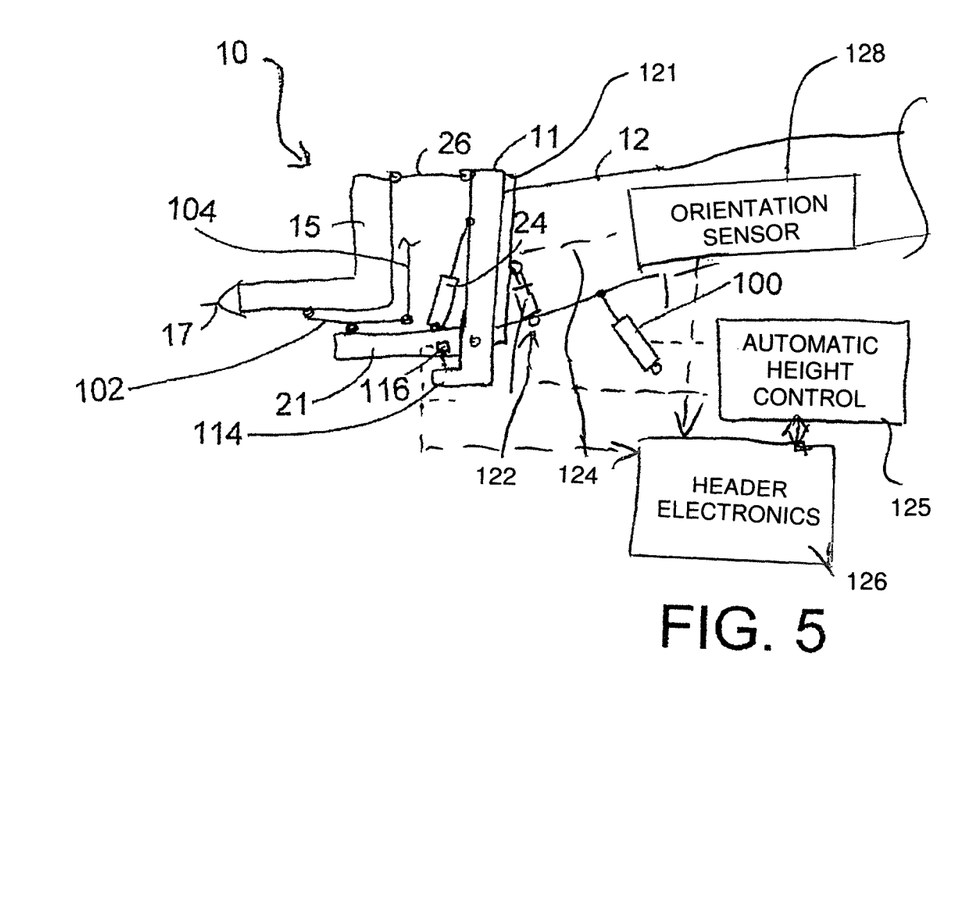
FIG. 5 is a schematic elevational view of the balancing linkage in relation to the suspension system supporting the header according to the present invention on the feeder house of a combine harvester.

In FIG. 5, the sensors 116 and 117 provide a lift signal to an automatic control system 125 of the combine harvester through a header control electronics system 126. The system 126 provides outputs to the control 125 to automatically maintain a required height of the feeder house by operating the height control cylinder 100 to keep the float provided by the float elements 24 approximately centralized. In addition the signals from the sensors 116 and 117 are used to detect the changes in the angle of the header to the adapter on the feeder house and to generate a differential or tilt signal.

A further input is provided by a combine orientation sensor 128 which measures changes in left to right incline of the combine harvester typically for purposes of controlling the combine threshing system which is sensitive to combine incline.

In general, the height control cylinder 100 which is arranged to raise and lower the feeder house of the combine harvester, receives the signal from the sensors 116 and 117 as an input and is automatically operated so as to attempt to maintain the sensed distance of both sensors at a required set value. The set value is selected so that the header is free to float between the bottom stop 114 and the upper limited movement both upwardly and downwardly to accommodate changes in ground height and is maintained at a mid-height of the float range.

The feeder house 12 also includes a front face plate 121 connected to the adapter of the header which can rotate about a longitudinal axis of the feeder house as indicated at 124 driven by cylinders 122, 123 on respective sides of the feeder house. This face plate is provided on conventional combine harvesters for use with fixed headers so as to change the angle of the header about the axis 124 to raise and lower each side as required to attempt to match changes in the ground level relative to the orientation of the combine itself as detected by ground engaging sensors.

In the present arrangement there are no ground engaging sensors and instead the output from the sensors 116 and 117 is also used to control the angle of the header. In the embodiment of FIGS. 2 and 5, this control of the angle of the header is controlled by the angle of the face plate around the axis 124.

It will be appreciated that the floating action of the header on the independent float elements 24 allows each end of the header to rise and fall according to local ground height. In a rigid header this floating action can allow a movement in the order of 3 degrees. In a wing header of the type specifically described above, the wings also can rise relative to the center section so that the end of the wings can rise relative to the outer end of the center section by an angle of the order of 2.25 to 3.18 degrees.

Figure 3:
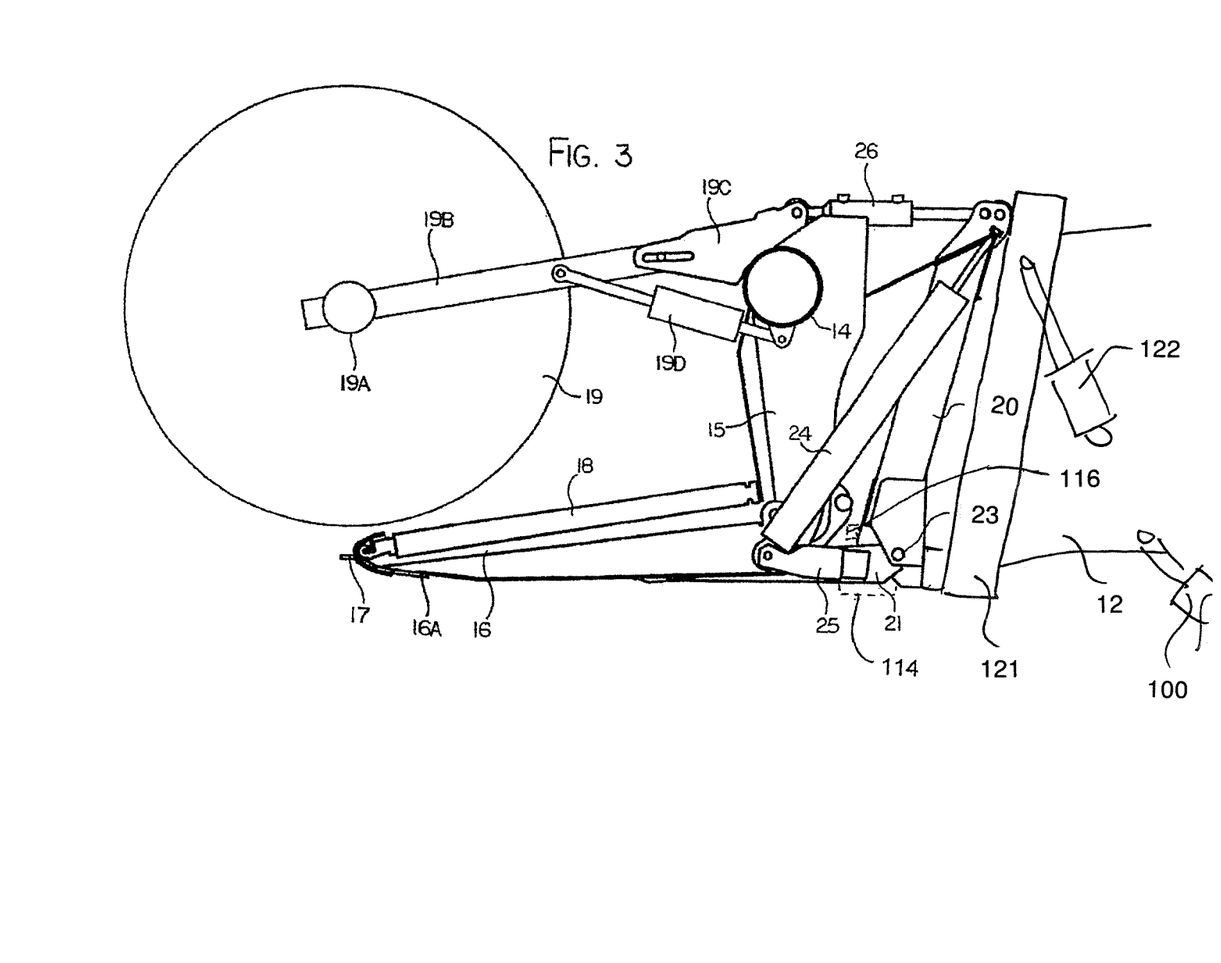
FIG. 3 is a side elevational view of the multi-section header according to the present invention showing the header float control system operating on the feeder house of the combine harvester.

In the present arrangement of FIG. 3, the system 126 is arranged so that changes of angle of the header as detected by a difference in output between the sensors 116 and 117 is used to rotate the face plate but in the opposite direction to the movement. That is, if the left end of the header is rising as detected by the sensors 116 and 117, the face plate is rotated in the direction to relatively increase the lift force from the float element 24 on the right side of the header while relatively reducing the lift force from the float element on the left side of the header and vice versa. It will be appreciated that a differential in the movement at the sensors 116 and 117 may be obtained by one end rising relative to the other end or by one end falling relative to the other end while the other end may be stationary or may itself be moving. The sensors 116 and 117 detect relative movement to generate a differential signal and detect common up and down movement to generate the lift signal used to control cylinder 100.

In other words, the distance sensors 116, 117 provide a differential value indicative of which end of the header is rising. The control system is then actuated to counteract that movement by adjusting the float system so as to make the rising end heavier and the falling end lighter. That is the lift forces do not assist the lifting movement of the lifting end but instead counteract that movement.

In FIG. 3, the differential signal from the sensors 116 and 117 is used by the header electronics 126 to provide a signal to the automatic height control system 125 of the combine harvester to operate the cylinders 122 and 123 to rotate the face plate 121. In some embodiments the header is a separate component from the combine harvester manufactured by a separate manufacturer. In this case the header electronics is not directly connected to the combine electronics to provide direct control thereof. In this arrangement, the automatic height control system 125 of the combine harvester is arranged to receive raw output signals from the sensors 116 and 117 and from those raw signals to carry out the necessary calculation to provide control signals to the cylinders 100, 122 and 123. In order to provide the required signals to the cylinders 122 and 123 it is necessary for the header electronics to generate a pseudo signal representing raw the signal from the sensors 116 and 117 which is calculated to force the automatic height control system 125 to carry out the required action.

That is, on receiving a signal from the sensors 116 and 117 indicative of the left end of the header rising, the header electronics calculates a false value or pseudo signal of the signals from the sensors 116 and 117 indicating to the automatic height control system 125 that the left end of the header is falling. This causes the automatic height control system 125 to generate signals to the cylinders 122 and 123 to rotate the face plate 121 in a direction to reduce the lift force on the left float element 241 so as to increase the weight of the left end of the header to counteract the rise of the left end. This operation is contrary to the action of the combine harvester. Symmetrically when the right end of the header is rising the electronics is arranged to generate signal values causing the combine electronics to reduce the lift force from the right float element.

Yet further, the header electronics 126 is arranged to receive a signal from the orientation sensor on the combine harvester which is indicative of the inclination of the combine itself relative to the longitudinal axis. This signal is used to manage the pseudo signals from the sensors 116 and 117 so that they are also responsive to the tilt of the combine. In particular the pseudo signals are controlled so that within an angle of tilt of the combine less than a predetermined threshold value, the pseudo signals are arranged to indicate to the automatic height control system 125 the actual values of the sensors. That is, below the threshold angle the system acts to cause the faceplate to follow the centre section or maintain set point position or force on the left and right, approximately around the middle of the range. After the threshold angle, the system operates to generate pseudo signals that have an amplitude relative to the side hill angle of the propulsion vehicle. That is, when the tilt of the combine exceeds this predetermined value, the pseudo signals are re-calculated to provide the above effect where the action of the combine is to counter the actual tilt of the header. In the arrangement of FIGS. 3 and 5, the float elements are provided by springs where the lift force provide by the spring is controlled by moving one end of the spring to increase or decrease the effective length thereof. As shown in FIG. 6 the float elements 241 and 242 are provided by cylinders where the lift force of the cylinder is controlled by pressure changes in a chamber of the cylinder as obtained by a pressure control system 245.

In the arrangement of FIG. 6, the pressure control is operated by the header electronics indicated at 246 independently of the combine electronics. In this arrangement the sensors 116 and 117 provide signals to the header electronics 246 and from these signals the header electronics 245 operates the pressure control to provide the required lift forces as described above. That is the system provides at least one sensor 116, 117, which can be a single sensor detecting tilt, for detecting the angle of tilt of the header so as to detect when the left end is raised relative to the right end and when the right end is raised relative to the left end. The control system 246 operates for decreasing the left lift force when the sensor indicates that the left end is raised relative to the right end and for decreasing the right lift force when the sensor indicates that the right end is raised relative to the left end. The arrangement in FIG. 6 also includes a tilt sensor 247 for detecting the tilt of the propulsion vehicle. In this way the system of FIG. 6, using springs or cylinders, can operate as described above to provide the required lift forces.

The lateral tilt system can also be used to extend the flex range by tilting the combine faceplate in the 'downhill' direction when the float system is approaching the end of its range. This again is achieved by calculating pseudo signals to be supplied to the combine electronics to force the system to rotate the face plate in a direction to increase the lift force at the raised side so as to decrease the ground force and cause the raised side to raise further to extend the flex range.

The invention claimed is:

1. A crop harvesting header comprising:
    a main frame structure extending across a width of the header and moving in a forward direction generally at right angles to the width across ground including a crop to be harvested;
    a mounting assembly carrying the main frame structure on a propulsion vehicle;
    a cutter bar across a front of the main frame structure which cuts the crop as the header is moved in the forward direction;
    a ground engaging element which engages and slides over the ground at the cutter bar and is connected to the cutter bar and supports the cutter bar at a cutting height spaced from the ground;
    the mounting assembly comprising left and right float elements;
    each of the left and right float elements applying a respective left and right lift force to the header;

the left and right float elements applying a total lift force which is less than a weight of the header with a remaining portion of the weight of the header being applied to the ground by the ground engaging element as a ground force;

the float elements allowing lifting of each end of the header relative to an opposed end in response to changes of the ground force;

lifting of each end of the header caused by the float elements changing an angle of tilt of the header relative to the propulsion vehicle;

at least one sensor detecting changes in the angle of tilt of the header and providing a first signal when the left end is raised relative to the right end and a second signal when the right end is raised relative to the left end;

and a control system controlling said left and right float elements;

said control system decreasing the left lift force in response to said first signal of said at least one sensor indicating that the left end is raised relative to the right end;

and said control system decreasing the right lift force in response to said second signal of said at least one sensor indicating that the right end is raised relative to the left end.

2. The crop harvesting header according to claim 1 wherein each float element comprises a cylinder where a lift force of the cylinder is controlled by changing a pressure to a chamber of the cylinder.

3. The crop harvesting header according to claim 1 wherein each float element comprises a spring where a lift force of the spring is controlled by changing an effective length of the spring.

4. The crop harvesting header according to claim 1 wherein said at least one sensor comprises left and right sensors providing a differential signal.

5. The crop harvesting header according to claim 1 wherein said control system also controls a height control system in response to a signal from said at least one sensor raising and lowering a support element of the propulsion vehicle.

6. The crop harvesting header according to claim 1 wherein there is provided a vehicle tilt sensor responsive to tilt of the propulsion vehicle relative to a longitudinal axis of the vehicle and the control system decreases the left lift force when said at least one sensor indicates that the left end is raised relative to the right end and decreases the right lift force when said at least one sensor indicates that the right end is raised relative to the left end only when the tilt of the propulsion vehicle as detected by the vehicle tilt sensor is greater than a predetermined angle of tilt.

7. The crop harvesting header according to claim 1 wherein the propulsion vehicle is a combine harvester having a feeder house and a face plate thereon rotatable about a longitudinal axis and wherein the control system operates to rotate the face plate to change said left and right lift forces.

8. The crop harvesting header according to claim 7 wherein the face plate is rotated under control of a combine electronics system in response to signals from said at least one sensor and wherein the control system operates to provide at least one calculated pseudo sensor value to the combine electronics system in replacement for actual sensor values to change said left and right lift forces.

9. The crop harvesting header according to claim 1 wherein the left and right float elements are each connected between a location connected to the propulsion vehicle and the header and wherein the control system operates to change said left and right lift forces provided respectively by each of the left and right float elements.

10. The crop harvesting header according to claim 1 wherein the control system increases the left lift force on the left float element when the left end is raised to a position close to an end of a range of movement and increases the right lift force at the right float element when the right end is raised to a position close to the end of the range of movement.

11. The crop harvesting header according to claim 1 wherein the main frame structure includes a center frame portion, a first wing frame portion and a second wing frame portion;

the first wing frame portion is connected to the center frame portion by a first pivot coupling which provides pivotal movement of the first wing frame portion relative to the center frame portion about a first pivot axis extending in a plane parallel to the forward direction;

the first pivot coupling acts to support weight from the first wing frame portion while outboard weight from the first wing frame portion outboard of the first pivot coupling rotates the first wing frame portion about the first pivot coupling in a downward direction;

the second wing frame portion is connected to the center frame portion by a second pivot coupling which provides pivotal movement of the second wing frame portion relative to the center frame portion about a second pivot axis extending in a plane parallel to the forward direction;

the second pivot coupling acts to support weight from the second wing frame portion while outboard weight from the second wing frame portion outboard of the second pivot coupling rotates the second wing frame portion about the second pivot coupling in a downward direction;

a first interconnecting float linkage is connected between the center frame portion and the first wing frame portion which communicates a first variable lifting force from the center frame portion to the first wing frame portion against the outboard weight of the first wing frame portion;

a second interconnecting linkage is connected between the center frame portion and the second wing frame portion which communicates a second variable lifting force from the center frame portion to the second wing frame portion against the outboard weight of the second wing frame portion.

12. A combine harvester comprising:

a harvester body on ground wheels moving in a forward direction across ground including a crop to be harvested;

a feeder house feeding crop into the harvester body;

a face plate at a front of the feeder house rotatable about an axis along the forward direction;

a header mounted on the face plate having a main frame structure extending across a width of the header and moving in the forward direction;

a mounting assembly carrying the main frame structure on the face plate;

a cutter bar across a front of the main frame structure which cuts the crop as the header is moved in the forward direction;

a ground engaging element which engages and slides over the ground at the cutter bar and is connected to the cutter bar and supports the cutter bar at a cutting height spaced from the ground;

the mounting assembly comprising left and right float elements;

each of the left and right float elements applying a respective left and right lift force to the header;

the left and right float elements applying a total lift force which is less than a weight of the header with a remaining portion of the weight of the header being applied to the ground by the ground engaging element as a ground force;

the float elements allowing lifting of each end of the header relative to an opposed end in response to changes of the ground force;

lifting of each end of the header changing an angle of tilt of the header relative to the harvester body;

at least one sensor detecting changes in the angle of tilt of the header and providing a first signal when the left end is raised relative to the right end and a second signal when the right end is raised relative to the left end;

wherein the face plate is rotated under control of a combine electronics system in response to signals from said at least one sensor so as to modify said respective left and right lift forces applied by the left and right float elements;

and wherein the header includes a control system which operates to provide at least one calculated pseudo sensor value to the combine electronics system in replacement for actual sensor values to rotate the face plate and change said left and right lift forces.

13. The combine harvester according to claim 12 wherein each float element comprises a cylinder where a lift force of the cylinder is controlled by changing a pressure to a chamber of the cylinder.

14. The combine harvester according to claim 12 wherein each float element comprises a spring where a lift force of the spring is controlled by changing an effective length of the spring.

15. The combine harvester according to claim 12 wherein said control system also controls a height control system in response to a signal from said at least one sensor for raising and lowering the feeder house.

16. The combine harvester according to claim 12 wherein there is provided a harvester body tilt sensor responsive to tilt of the harvester body relative to a longitudinal axis of the harvester body and the control system decreases the left lift force when said at least one sensor indicates that the left end is raised relative to the right end and decreases the right lift force when said at least one sensor indicates that the right end is raised relative to the left end only when the tilt of the harvester body as detected by said harvester body tilt sensor is greater than a predetermined angle of tilt.

17. The combine harvester according to claim 12 wherein the control system increases the left lift force on the left float element when the left end is raised to a position close to an end of a range of movement and increases the right lift force at the right float element when the right end is raised to a position close to the end of the range of movement.

18. The combine harvester according to claim 12 wherein the main frame structure includes a center frame portion, a first wing frame portion and a second wing frame portion;

the first wing frame portion is connected to the center frame portion by a first pivot coupling which provides pivotal movement of the first wing frame portion relative to the center frame portion about a first pivot axis extending in a plane parallel to the forward direction;

the first pivot coupling acts to support weight from the first wing frame portion while outboard weight from the first wing frame portion outboard of the first pivot coupling rotates the first wing frame portion about the first pivot coupling in a downward direction;

the second wing frame portion is connected to the center frame portion by a second pivot coupling which provides pivotal movement of the second wing frame portion relative to the center frame portion about a second pivot axis extending in a plane parallel to the forward direction;

the second pivot coupling acts to support weight from the second wing frame portion while outboard weight from the second wing frame portion outboard of the second pivot coupling rotates the second wing frame portion about the second pivot coupling in a downward direction;

a first interconnecting float linkage is connected between the center frame portion and the first wing frame portion which communicates a first variable lifting force from the center frame portion to the first wing frame portion against the outboard weight of the first wing frame portion;

a second interconnecting linkage is connected between the center frame portion and the second wing frame portion which communicates a second variable lifting force from the center frame portion to the second wing frame portion against the outboard weight of the second wing frame portion.

* * * * *